United States Patent
Brown et al.

(10) Patent No.: US 7,010,288 B2
(45) Date of Patent: Mar. 7, 2006

(54) SYSTEM AND METHOD FOR PROVIDING AN AUTOMATIC RESPONSE TO A TELEPHONE CALL

(75) Inventors: Barbara L. Brown, Seattle, WA (US); Umesh Amin, Redmond, WA (US)

(73) Assignee: Cingular Wireless II, LLC, Atlanta, GA (US)

( * ) Notice: Subject to any disclaimer, the term of this patent is extended or adjusted under 35 U.S.C. 154(b) by 481 days.

(21) Appl. No.: 10/140,135

(22) Filed: May 6, 2002

(65) Prior Publication Data
US 2004/0203794 A1   Oct. 14, 2004

(51) Int. Cl.
H04L 12/58 (2006.01)

(52) U.S. Cl. ............... 455/412.1; 455/550.1; 455/567; 455/415; 455/413; 455/417

(58) Field of Classification Search .......... 455/550.1, 455/552.1, 569.1, 567, 415, 422.1, 412.1, 455/414.4, 418–420, 563; 379/88.04, 88.07, 379/88.16; 704/270; 701/36, 1
See application file for complete search history.

(56) References Cited

U.S. PATENT DOCUMENTS

| | | | |
|---|---|---|---|
| 5,031,205 A * | 7/1991 | Phillips | 379/88.23 |
| 5,189,692 A * | 2/1993 | Ferrara | 379/88.28 |
| 5,642,406 A * | 6/1997 | Gahang | 379/67.1 |
| 5,649,305 A * | 7/1997 | Yoshida | 455/564 |
| 5,715,311 A * | 2/1998 | Sudo et al. | 379/433.01 |
| 5,937,039 A * | 8/1999 | Cho | 379/93.17 |
| 6,119,022 A * | 9/2000 | Osborn et al. | 455/567 |
| 6,199,022 B1 * | 3/2001 | Cunningham | 702/54 |
| 6,339,637 B1 * | 1/2002 | Toshimoto | 379/88.22 |
| 6,351,637 B1 * | 2/2002 | Lee | 455/415 |
| 6,456,976 B1 * | 9/2002 | Kuita | 704/273 |
| 6,577,859 B1 * | 6/2003 | Zahavi et al. | 455/412.1 |
| 6,584,180 B1 * | 6/2003 | Nemoto | 379/88.01 |
| 6,587,700 B1 * | 7/2003 | Meins et al. | 455/575.8 |
| 6,718,187 B1 * | 4/2004 | Takagi et al. | 455/550.1 |
| 6,842,622 B1 * | 1/2005 | Peters et al. | 455/458 |
| 6,941,131 B1 * | 9/2005 | Roderique | 455/417 |
| 2001/0016507 A1 * | 8/2001 | Karusawa | 455/575 |
| 2002/0045439 A1 * | 4/2002 | Kushita | 455/412 |
| 2002/0052225 A1 * | 5/2002 | Davis et al. | 455/567 |
| 2003/0045279 A1 * | 3/2003 | Shostak | 455/422 |
| 2003/0054865 A1 * | 3/2003 | Byers et al. | 455/567 |

(Continued)

FOREIGN PATENT DOCUMENTS

DE    100 52 368 A1 *  5/2002

Primary Examiner—Joseph Feild
Assistant Examiner—Kamran Afshar
(74) Attorney, Agent, or Firm—Perkins Coie LLP (57) ABSTRACT

Disclosed embodiments include a system and method for providing an automatic response to a telephone call. The automatic response module may be integral to a wireless phone or may be added afterwards, such as with a plug-in module, or may be provided by a third party provider, such as on a network. In one embodiment, the user of a wireless phone may select one or more automatic responses in the form of pre-recorded messages that will be played to a caller when an incoming telephone call is received. In another embodiment, the pre-recorded messages may be text or other graphical messages. In an alternative embodiment, a selection algorithm may be used that selects the appropriate automatic response based on pre-determined criteria, such as information in the user's calendar, contact list, etc. Many other alternatives and alternative embodiments are also disclosed.

18 Claims, 7 Drawing Sheets

U.S. PATENT DOCUMENTS

| | | | |
|---|---|---|---|
| 2003/0123620 A1 * | 7/2003 | Matsuyama | 379/88.13 |
| 2003/0129968 A1 * | 7/2003 | Earl | 455/412 |
| 2004/0032934 A1 * | 2/2004 | Malik | 379/88.16 |
| 2005/0107114 A1 * | 5/2005 | Ocock | 455/550.1 |

* cited by examiner

Auto-Response Selection

Activate/Deactivate

Review Log

Auto-Response Messages
Button A:   Recorded Message  Change Message
Button B:   Record Message
Button C:   "Hi, this is John, I can't answer now, but I'll be able to call you back at 3 pm"
Button D:   "Hi, this is John with ABC Widgets. I'm unavailable now, but I will be able to call you back shortly"
Button E:   "Honey, I'll be home late tonight."
Button F:   "Please put this number on your do not call list."

Selection Algorithm
*Calendar-based*
    Between 2-3 use button C
*Contact-based*
    Spouse - use button E
    Work contacts - use Button D
    Personal Contacts - use Button C
*Unknown*
    Use Button A
*Telemarketers*
    Use Button F

*Fig. 7*

SYSTEM AND METHOD FOR PROVIDING AN AUTOMATIC RESPONSE TO A TELEPHONE CALL

BACKGROUND

Embodiments of the invention relate generally to devices for providing an automatic response to a telephone call, such as for a wireless device.

Cellular mobile telephony, or wireless telephony, provides voice data links between users of mobile devices and fixed devices on a network. It gives users using a wireless phone or other wireless device mobility without regard to how they are actually connected to the network. This is done by providing access points or base station units that can hand off the connections of mobile devices without interruption of the service. 2G (second-generation) digital mobile phone service such as the Global System for Mobile Communications (GSM), EIA/TIA-136 Time Division Multiple Access (TDMA), TIA-IS-95 Code Division Multiple Access (CDMA), and the AMPS (analog mobile phone service) are examples of such telephone networks.

Wireless devices are continually increasing in popularity as their utility increases and as their disadvantages, such as cost and quality of the wireless connection, decrease. Wireless phones in particular have become very common, and owners of the wireless phones often carry these phones with them most of the time. Wireless phones typically have two states—on or off. When the phone is turned on, the wireless phone will ring or vibrate when an incoming call is received. When the phone is turned off, there is typically a voice mail capability that allows the caller to leave a voice mail message for the wireless phone owner.

As wireless phones become more and more ubiquitous, the backlash against them is increasing in intensity. Much of this backlash is based on the intrusiveness that wireless phones can cause. Wireless phones are especially intrusive when a ringer goes off in a public place, such as a theater, restaurant, bus, or other public facility. Moreover, many people become annoyed when others conduct conversations on their wireless phones in these public places, as these conversations often are loud and disruptive.

Many people turn off their wireless phones when in public places and rely on their voice mail to respond to calls in order to prevent interfering with others. However, this may result in the accumulation of a large number of voice mail messages. Moreover, many wireless phone plans do not include voice mail. Another option would be for a wireless phone user to change their outgoing message on their voice mail to inform callers that they are temporarily in a public place and cannot take the call. However, it is relatively complicated to change an outgoing message, and many users do not desire to change their outgoing message each time they go out to eat, go to a restaurant, etc. It would be desirable to be able to reduce the time and/or effort, and improving the experience, associated with responding to a call when users are in a public place or other location where answering the phone may be problematic.

In the drawings, the same reference numbers identify identical or substantially similar elements or acts. To easily identify the discussion of any particular element or act, the most significant digit or digits in a reference number refer to the Figure number in which that element is first introduced, e.g., element 102 is first introduced and discussed with respect to FIG. 1.

Note that the headings provided herein are for convenience and do not necessarily affect the scope or interpretation of the invention.

DETAILED DESCRIPTION

A system and method for automatically responding to an incoming telephone call for a user on a wireless device is provided. In one embodiment, the system receives an incoming telephone call and then receives a request from a user to automatically response the incoming call. The system then connects the incoming telephone call and transmits a pre-recorded message over the voice path, the voice path being created when the incoming telephone call was connected. The system then disconnects the telephone call after the pre-recorded message has been transmitted. In alternative embodiments, the user may select from a plurality of pre-recorded messages. The system may also access a database, such as a schedule/calendar or a contact list, in order to determine the appropriate pre-recorded message to be transmitted.

In another alternative embodiment, the user may activate the automatic response system so that all incoming telephone calls are automatically responded to. In yet another alternative embodiment, a text message may be transmitted instead of a voice message.

The system and method for automatically responding to an incoming telephone call provide numerous benefits over other systems. For example, a user can easily and flexibly provide a response to incoming calls without receiving too many voice mail messages and without disturbing nearby persons. Other benefits are described in more detail below. In addition, the need to change a user's voice mail outgoing message to customize the response to individual telephone calls is lessened or eliminated.

The following description provides specific details for a thorough understanding of, and an enabling description of, embodiments of the invention. However, one skilled in the art will understand that the invention may be practiced without these details. In other instances, well known structures and functions have not been shown or described in detail to avoid unnecessarily obscuring the description of the embodiments of the invention.

Depicted embodiments of the present invention are intended for use with any suitable wireless device, such as a wireless phone or wireless web access device. By way of example, the preferred embodiments will be described with reference to a wireless phone 100. One skilled in the art would recognize that other wireless devices are within the scope of the invention, such as a wireless web access telephone, wireless computer access device, Internet-enabled PDA, automobile-based web access device, laptop or palmtop computer, mobile or vehicle-based location-determining device (e.g., Global Positioning System-based device) or other portable or mobile communication devices. The wireless phone 100 may be any phone manufactured by, or substantially compatible with any phone manufactured by, companies such as Nokia, Ericsson, Motorola, etc. PDA's may be manufactured by, or substantially compatible with any phone manufactured by, companies such as Palm, Handspring, etc., or a PDA using the Windows CE, Palm, or other operating systems.

Figure 1:
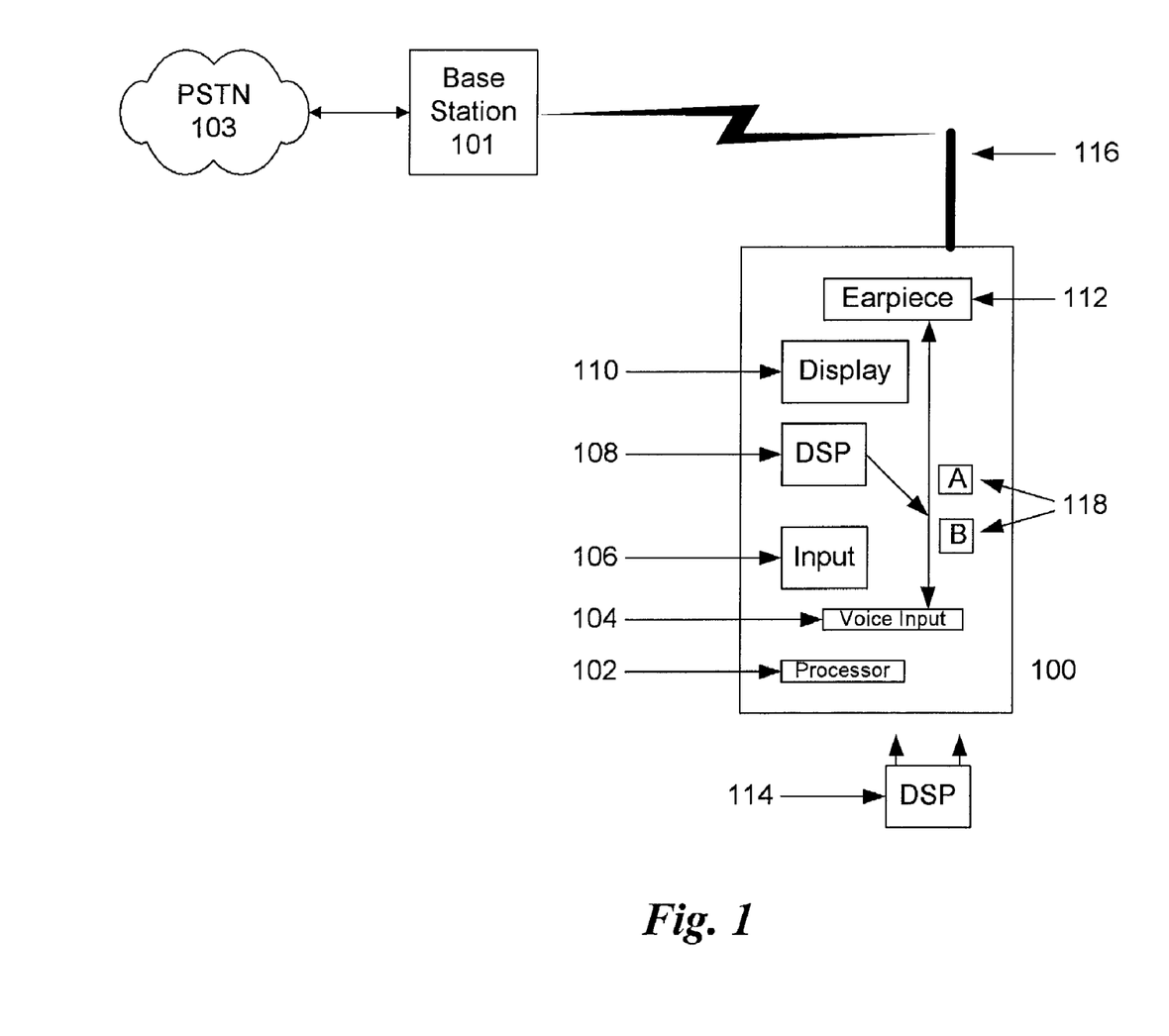
FIG. 1 shows a block diagram of a wireless phone with an auto-response module in a suitable environment in one embodiment of the invention.

FIG. 1 shows a block diagram of a wireless phone with an auto-response module in a suitable environment in one embodiment of the invention. In FIG. 1, the wireless phone 100 communicates with a base station 101 via an antenna 116. The base station 101 may be in communication with a publicly switched telephone network (PSTN) 103 directly, via a mobile switching center (MSC), or via other facilities or methods. The antenna 116 allows wireless communications between the wireless phone 100 and a base station 101, access point, or other components of a wireless or cellular network. The wireless phone 100 typically has a display screen 110 and integral user input controls 106 that are suitably buttons such as membrane switches. The wireless phone 100 also typically has an earpiece 112, such as a speaker, and voice input device 104, such as a microphone, for playing sounds to the user and receiving sounds from the user, respectively.

The wireless phone of FIG. 1 may also have an integral auto-response module 108 or a plug-in auto-response module 114. The auto-response modules 108, 114 may include a digital signal processor (DSP) chip that may be adapted to store one or more voice or text messages to be sent in response to an incoming telephone call. One skilled in the art will recognize that many embodiments are possible, including auto-response modules including a SIM card, modules that attached via a headset or other port, other storage or recordable media devices, a module that communicates with the wireless phone 100 via a wireless protocol such as Bluetooth, utilization of the integral memory of the wireless phone 100 to store outgoing messages, etc. In another embodiment, much of the functionality could be provided on the network (e.g., intercepting and responding to calls before it even reaches the wireless phone), but this may result in undesirably high network traffic.

The wireless phone 100 may also have one or more integral auto-response selector buttons 118. As described in more detail below, the auto-response selector buttons 118 may be used to turn on the auto-response function or to select a particular message to be used for the auto-response, or may even be used to choose a selection algorithm for customized auto-response selection. In an alternative embodiment, the auto-response selector buttons 118 may be located on the plug-in auto-response module 114 or in another location. In yet another alternative embodiment, the auto-response selector buttons 118 may have other functions on the wireless phone 100 (such as may occur when pre-existing buttons are reprogrammed to also function as auto-response selectors).

In one embodiment, the auto-response modules 108, 114 may be located within a housing or other structure. In this embodiment, the integral auto-response selector buttons 118 may be accessible to a user from outside the housing, such as via cut-outs or other methodologies.

In another embodiment, the wireless phone 100 may utilize 'soft keys' or soft buttons instead of auto-response selector buttons 118. In this embodiment, soft menus (e.g., menus created via software) are displayed on the display screen 110 and a user may select choices from these menus. This embodiment provides an easily changeable and customizable solution that does not require any hardware changes.

Unless described otherwise below, the construction and operation of the various blocks shown in FIG. 1 and the other Figures are of conventional design. As a result, such blocks need not be described in further detail beyond that provided herein, because they will be understood by those skilled in the relevant art. Such further detail is omitted for brevity and so as not to obscure the detailed description of the invention. Any modifications necessary to the blocks in FIG. 1 (or other Figures and embodiments) can be readily made by one skilled in the relevant art based on the detailed description provided herein.

Figure 2:
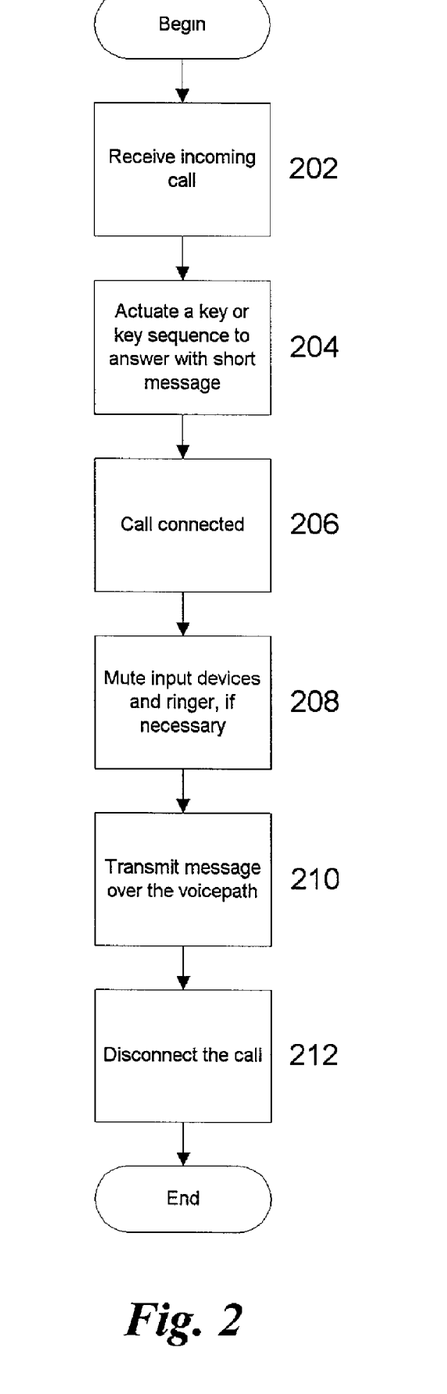
FIG. 2 is a flowchart depicting an auto-response of an incoming telephone call in one embodiment of the invention.

FIG. 2 is a flowchart depicting an auto-response of an incoming telephone call in one embodiment of the invention. The auto-response of FIG. 2 may be used when a user has a wireless phone 100 that is turned on and desires to ignore an incoming call and have the call automatically responded to. In block 202, the wireless phone 100 receives an incoming telephone call. A user may recognize that an incoming call is being received by the activation of a ringer, vibration device, visual notification (such as a light, text message, etc.), etc. In block 204, a user actuates a key or key sequence to request an auto-response to the incoming phone call. For example, a user could select an auto-response button 118 on their wireless phone 100 when their phone starts ringing, which would stop the ringing of the phone and initiate the auto-response sequence. In this way, the disruptive noise of the wireless phone 100 would be minimized.

In block 206, the incoming telephone call is connected. In one embodiment, the incoming telephone is connected in the same fashion as any incoming call would be connected. In block 208, the voice input device 104 and any output devices, such as a ringer, may be disabled so as to prevent unnecessary sounds and to prevent the user from being heard by the initiator of the incoming telephone call. The function continues in block 210, where an auto-response message is transmitted over the voicepath. Typically, the auto-response message is recorded earlier by the user for later use. For example, a user could record an auto-response message that said "Sorry, I can't answer the phone now as I'm at dinner, but I'll call you back after 7 p.m." before going to dinner. In this fashion, a user could easily customize the auto-response message, if desired. In block 212, the call is disconnected. From the point of view of the person making the incoming telephone call, the line will be picked-up, the auto-response message will play, and then the line will be disconnected. This eliminates the need for the person to leave a voicemail or other message. However, information identifying the caller or the phone number of the caller (perhaps gathered from caller identification (ID)/automatic number identification (ANI) information) may be recorded so that the user will know the identity of the caller for any calls that are automatically responded to.

In one alternative embodiment, auto-response messages or other items may be electronically transferred to the wireless phone 100 via a network, e-mail, infrared, or other electronic transfer method. For example, a user could download default messages, customized (and perhaps copyrighted) content, etc.

Figure 3:
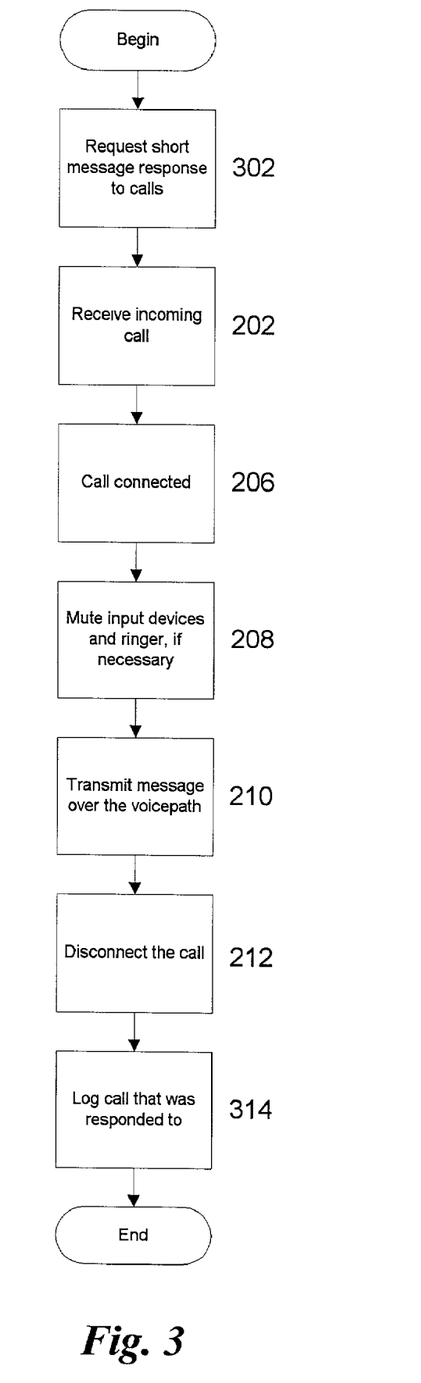
FIG. 3 is a flowchart depicting an auto-response of an incoming telephone call in a first alternative embodiment of the invention.

FIG. 3 is a flowchart depicting an auto-response of an incoming telephone call in a first alternative embodiment of the invention. The embodiment depicted in FIG. 3 is a modification of the embodiment of FIG. 2. In general, alternatives and alternative embodiments described herein are substantially similar to previously described embodiments, and common elements and functions are identified by the same reference numbers. Only significant differences in construction or operation are described in detail. In block 302 of FIG. 3, the user requests that incoming telephone calls be automatically responded to before an incoming call is received. As in block 204, the user may request this function by actuating a key or key sequence that is pre-programmed to start the auto-response function. For example, wireless phones 100 with integral auto-response modules 108 may also include one or more auto-response buttons 118 that would start the auto-response function until further notice or user input. In block 314, any call that was automatically responded to is logged so that the user may see which calls were "missed," assuming caller ID/ANI information was available. For example, a user could turn "on" the auto-response function for two hours while at dinner, receive three separate incoming phone calls, have the auto-response function respond to each, and later see a log of the calls that were automatically responded to in order to determine which, if any, to which he or she should ultimately respond. One skilled in the art will recognize that many options exist for creating a log of calls received and all are within the scope of the invention. This embodiment allows a user to auto-response any received calls without any real-time action by the user, which also prevents the wireless phone 100 from ringing and disturbing any other persons, in addition to preventing the unnecessary accumulation of voice mails.

Figure 4:
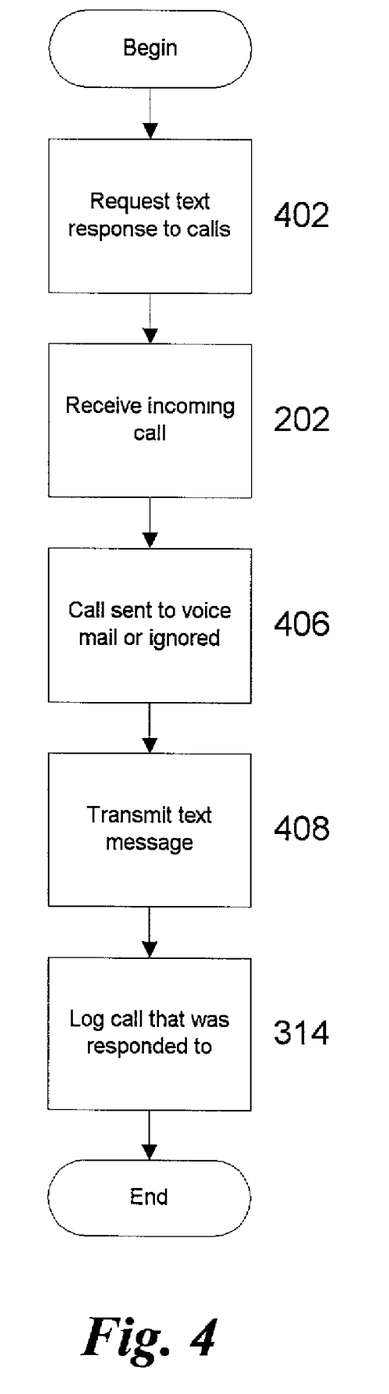
FIG. 4 is a flowchart depicting an auto-response of an incoming telephone call in a second alternative embodiment of the invention.

FIG. 4 is a flowchart depicting an auto-response of an incoming telephone call in a second alternative embodiment of the invention. The embodiment depicted in FIG. 4 is a modification of the embodiment of FIG. 3. In block 402 of FIG. 4, the user requests that incoming telephone calls be automatically responded to with a text response. As in block 302, the user may request this function by actuating a key or key sequence that is pre-programmed to start the auto-response function. For example, wireless phones 100 with integral auto-response modules 108 may also include one or more auto-response buttons 118 that would start the auto-response function until further notice. In block 406, the incoming call is either sent to voice mail or ignored. Because the message will be responded to via a text message, the call need not be connected. The function continues in block 408, where the text message is transmitted to the initiator of the incoming phone call. The text message may be transmitted using any suitable protocol, such as Short Message Service (SMS) or other protocols. In this embodiment, a user could turn "on" the auto-response function for two hours while at dinner, receive three separate incoming phone calls, have the auto-response function respond to each with a text message and send each call to voice mail, and see a log of the calls that were automatically responded to in order to determine which, if any, to which he or she should ultimately respond.

Figure 5:
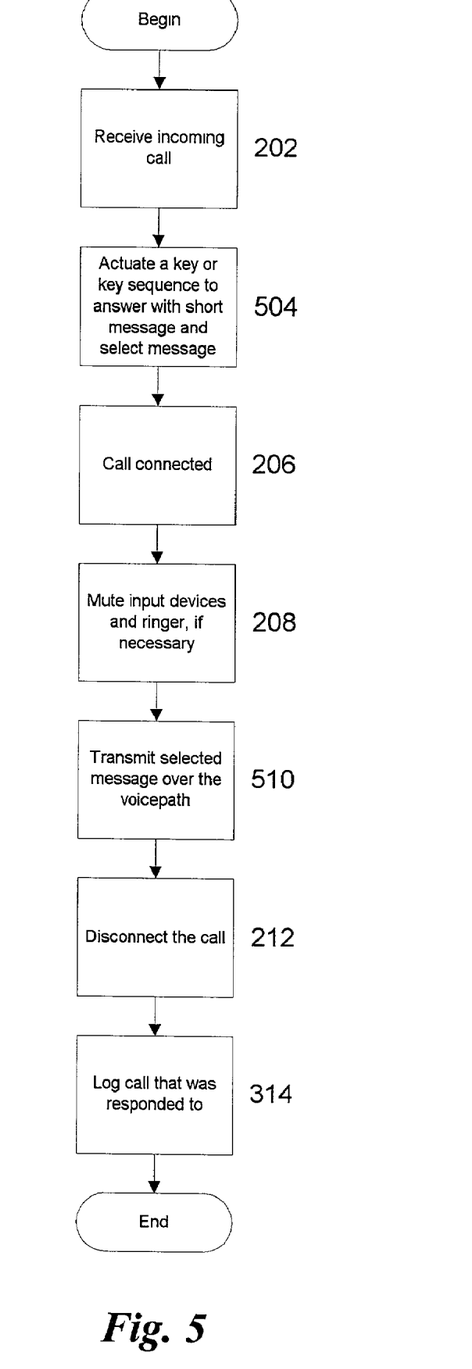
FIG. 5 is a flowchart depicting an auto-response of an incoming telephone call in a third alternative embodiment of the invention.

FIG. 5 is a flowchart depicting an auto-response of an incoming telephone call in a third alternative embodiment of the invention. The embodiment depicted in FIG. 5 is another modification of the embodiment of FIG. 2. The auto-response of FIG. 5, like that of FIG. 2, may be used when a user has a wireless phone 100 that is turned on and desires to ignore the call and have the call automatically responded to. In block 504, a user actuates a key or key sequence to request a particular pre-programmed auto-response to an incoming phone call. For example, a user could select one of multiple auto-response buttons 118 on their wireless phone 100 when their phone starts ringing, which would stop the ringing of the phone and initiate the appropriate auto-response sequence. In this embodiment, the user may choose from multiple options for the pre-programmed auto-response. For example, a user could have different pre-programmed messages for family members, friends, business associates, his or her boss, etc., and could select the appropriate response based on caller ID and/or ANI information. In this fashion, the auto-response could be customized for a variety of situations. In yet another embodiment, the user could pre-program messages for different situations, such as telling the caller that the user is at dinner, at a movie, is indisposed, etc. In another embodiment, the user could indicate when they will respond (e.g., tell caller that will respond within an hour for their boss but the next day for an in-law), who else to contact, to press a key (e.g., '#' symbol) to leave a message, etc. The user may choose from the multiple options by selecting one of the auto-response buttons 118 that corresponds to the desired auto-response.

In block 510, the selected auto-response message will play and be transmitted over the voicepath, and in block 212 the telephone call will be disconnected. In block 314, the call that was automatically responded to is logged so that the user may see which calls were "missed," assuming caller ID/ANI information was available. Additionally, the particular auto-response that was used to respond may also be logged.

Figure 6:
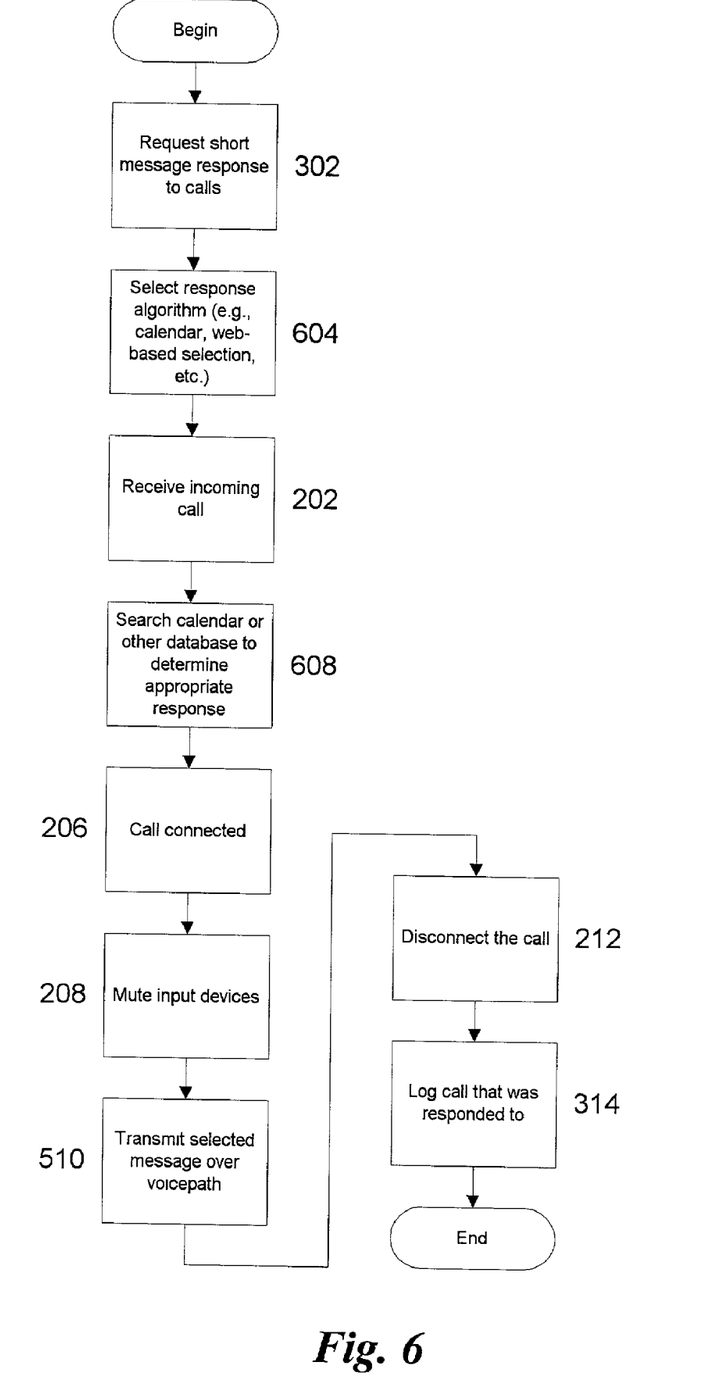
FIG. 6 is a flowchart depicting an auto-response of an incoming telephone call in a fourth alternative embodiment of the invention.

FIG. 6 is a flowchart depicting an auto-response of an incoming telephone call in a fourth alternative embodiment of the invention. The embodiment depicted in FIG. 6 is a modification and combination of some of the previous embodiments. The auto-response function of FIG. 6 may be used when a user has a wireless phone 100 and desires to turn on the auto-response function for a period of time. In block 604, the user may select a response algorithm. The response algorithm is the methodology that will be used to determine which of a plurality of auto-response will be used to respond to a particular telephone call. One response algorithm could involve searching a calendar or other database to compare the current time with the planned event and choosing an appropriate auto-response. For example, a user could have a calendar on their phone (available on many phones as well as wireless phones with personal data assistant (PDA) functionality) and have the response algorithm query the calendar to determine where the user may be when a call is received. In this embodiment, if a user is scheduled to be in a meeting, an auto-response tells the caller that the user is in a meeting, and will respond after the meeting. In another case, if a user was at dinner (and that engagement was in the calendar), a different and equally appropriate message could be used. A default message could be used in cases where no engagement was in the calendar. Time could also be a factor in the response algorithm—after reviewing the calendar, it could be determined that less than five minutes were left in a meeting and a message to that effect could be used (e.g., "I'm currently in a meeting, but should be able to call you within five minutes or so").

In another alternative embodiment, the user does not select the response algorithm, but instead the response algorithm is automatically chosen (which can also occur if there is only one response algorithm). In one example, a calendar could be used during the workday and a caller-based algorithm could be used at other times. One skilled in the art will recognize that many alternatives are possible and within the scope of the invention, including different databases (such as a Web-based calendar accessed by the wireless phone 100, a calendar on a Bluetooth or other wireless-protocol linked PDA, a database of response based on the caller that could be linked to entries in an address book), different algorithms (based on caller identification, time of day, scheduled activity, number of times that the user has called, combinations of factors, etc.), etc.

In block 608, the function searches the appropriate database to determine the desired response. As noted above, the appropriate database could involve an integral calendar, appointment book, or address book, a Web-based database, a database attached to the wireless phone 100 via a module, a database in communication with the wireless phone 100 via Bluetooth or another local wireless protocol, etc.

One skilled in the art will recognize that any combination of the above embodiments, as well as other embodiments, are possible and within the scope of the invention. For example, text messaging may be utilized with the embodiment describing selecting an auto-response message from a group of auto-response messages, perhaps by using a calendar or contact list.

Figure 7:
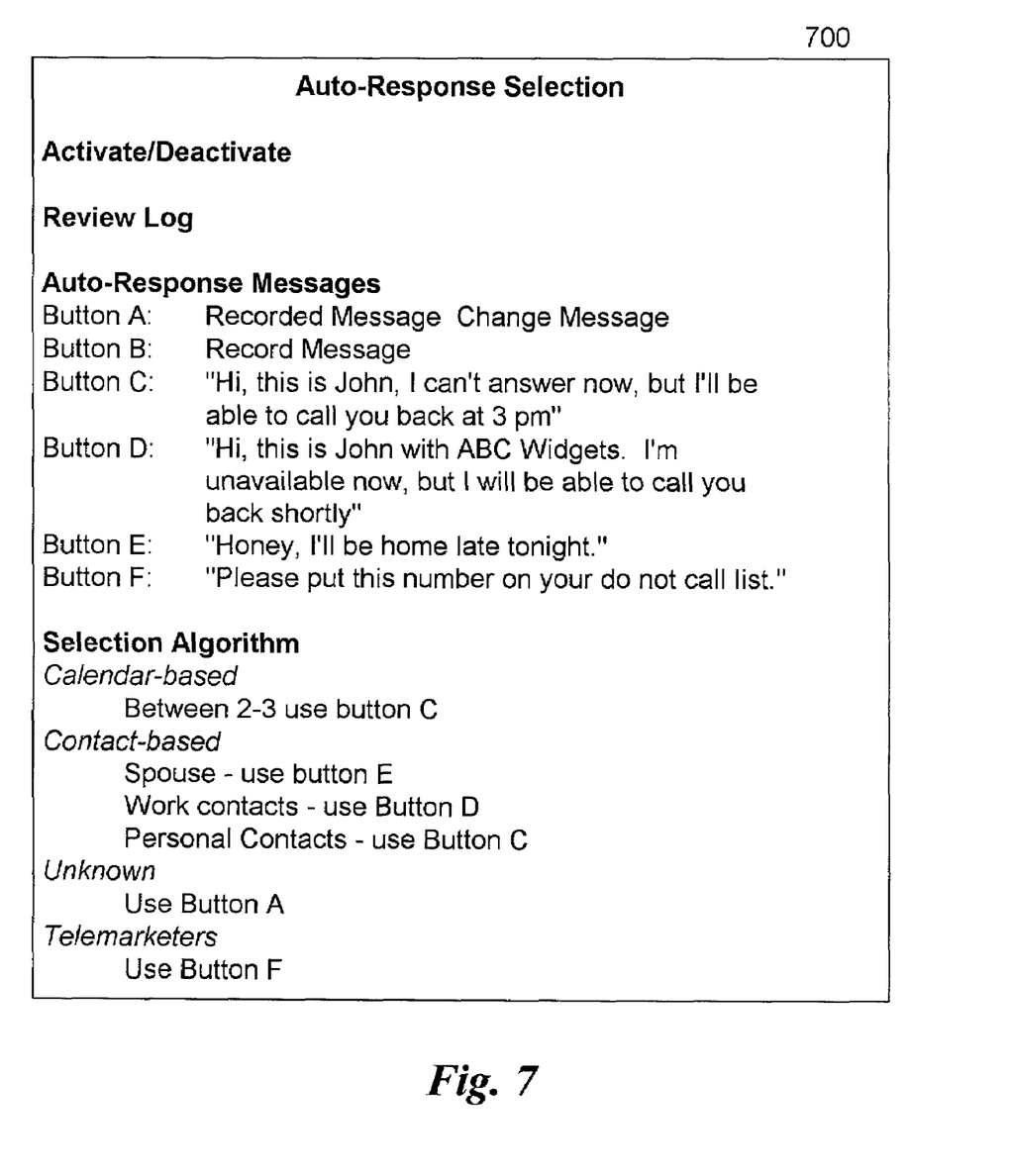
FIG. 7 illustrates the auto-response selection page of the auto-response system in one embodiment.

FIG. 7 illustrates an auto-response selection page that may be used with some of the above auto-response system embodiments. The auto-response selection page 700 allows a user to select the style and content of one or more auto-response messages that may be used to respond to incoming telephone calls, and also allows a user to configure the auto-response system. The auto-response selection page 700 may be located on a display screen 110 of the wireless phone 100, on a plug-in module 114, on a web page accessed from the wireless phone 100, on a web page that may be used to synchronize with a wireless phone 100 at occasional intervals, on a device connected to the wireless phone 100 via a wireless protocol such as Bluetooth, etc. One skilled in the art will recognize that many alternative designs, connections, and configurations of the auto-response selection page 700 are possible and within the scope of the invention.

The auto-response selection page 700 includes activation fields, a log field, auto-response message fields and selection algorithm fields. The activation fields allow a user to activate and deactivate the auto-response system. The log field allows a user to see a log of messages that were automatically responded to so that the user can decide whether to call the initiators of the call back. The auto-response message fields allow a user to input either a verbal message or a text message for each button. The buttons of the auto-response message fields may correspond to auto-response selection buttons 118 of the wireless phone 100. Button A indicates that a recorded verbal message is already saved in the system, and provides a way of allowing a user to change the message if desired. Button B indicates that no message is recorded for that button, but an option for a user to record a message is provided. Buttons C, D, E, and F all indicate that a text message has been entered and saved, but verbal messages could also be recorded and saved for each button. The selection algorithm fields provide the user with the option of selecting a selection algorithm to be used in determining which auto-response message will be played to the caller associated with an incoming telephone call. For example, a user could choose a calendar-based selection algorithm that would cause the auto-response system to review the user's calendar (being stored on the phone, on a Web site, or anywhere) and choose the auto-response message that was appropriate. In another depicted example, the algorithm would choose the auto-response message based on contacts. The user could, for instance, set up the algorithm to use one button (or message) for family, friends, work contacts, unknown callers, telemarketers, etc.

The auto-response system provides a number of potential benefits. For example, users may utilize the system to prevent their wireless phone from ringing in appropriate circumstances, such as when they are in a public place. The auto-response system improves on the traditional method of simply turning off the phone, as voice mail messages are not accumulated. Moreover, selections algorithms may be used to customize the auto-response depending on the activity of the user, the identity of the caller, etc., providing a more flexible and useful solution than voice mail systems. The auto-response system also eliminates the need for users to constantly change their outgoing message on their voicemail.

Those skilled in the relevant art will appreciate that the invention can be practiced with various telecommunications or computer system configurations, including Internet appliances, hand-held devices, wearable computers, palm-top computers, cellular or mobile phones, multi-processor systems, microprocessor-based or programmable consumer electronics, set-top boxes, network PCs, mini-computers, mainframe computers, and the like. Aspects of the invention can be embodied in a special purpose computer or data processor that is specifically programmed, configured, or constructed to perform one or more of the computer-executable instructions explained in detail herein. Indeed, the term "computer," as used generally herein, refers to any of the above devices, as well as to any data processor. Data structures and transmission of data particular to aspects of the invention are also encompassed within the scope of the invention. In general, while hardware platforms such as stationary and mobile devices are described herein, aspects of the invention are equally applicable to nodes on the network having corresponding resource locators to identify such nodes.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "above," "below," and words of similar import, when used in this application, shall refer to this application as a whole and not to any particular portions of this application. Use of the term "or," as used in this application with respect to a list of two or more items, shall be interpreted to cover any, all, or any combination of items in the list.

The above detailed descriptions of embodiments of the invention are not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. The teachings of the invention provided herein may be applied to other systems, not necessarily the system described herein. The various embodiments described herein can be combined to provide further embodiments. These and other changes can be made to the invention in light of the detailed description.

These and other changes can be made to the invention in light of the above detailed description. In general, the terms used in the following claims should not be construed to limit the invention to the specific embodiments disclosed in the specification, unless the above detailed description explicitly defines such terms.

Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

We claim:

1. A method of providing an automatic response to an incoming telephone call with a wireless telephone device, comprising:
   receiving an incoming telephone call;
   receiving a request from a user to automatically respond to the incoming call; connecting the incoming telephone call;
   transmitting a request to an internal database within the wireless device for additional information;
   receiving additional information from the internal database;
   selecting a pre-recorded message to be transmitted based at least partially on the additional information received, wherein the pre-recorded message is selected from a group of pre-recorded messages;
   transmitting the pre-recorded voice message over a voice path, the voice path being created when the incoming telephone call was connected;
   disconnecting the incoming telephone call after the pre-recorded voice message has been transmitted without accepting a voice message from a caller; and
   creating an entry in a log indicating that the incoming telephone call was automatically responded to;
   wherein the request from the user is either in response to and during an incoming telephone call or is received before the incoming telephone call is received.

2. The method of claim 1 further comprising providing an indication of the identity of the phone number associated with the telephone making the incoming call before receiving the request from the user.

3. The method of claim 1 wherein the internal database contains information about the user's schedule,
   and wherein further the
   additional information includes information concerning a scheduled current activity of the user.

4. The method of claim 1 wherein the internal database contains information about the user's contacts, and
   wherein further the additional information includes information concerning an identity of the person making the incoming call.

5. A method, for use with a wireless phone, of providing an automatic response to an incoming telephone call, comprising:
   receiving a request from a user that incoming telephone calls are to be automatically responded to;
   at the wireless phone, receiving an incoming telephone call;
   connecting the incoming telephone call to the wireless phone;
   employing a reseonse algorithm to select a pre-recorded voice message, wherein the pre-recorded voice message is selected from a plurality of pre-recorder voice messages saved in an internal database within the wireless phone;
   transmitting the pre-recorded voice message over a voice path, the voice path being created when the incoming telephone call was connected to the wireless phone; and
   disconnecting the incoming telephone call after the pre-recorded voice message has been transmitted without accepting a voice message from a caller.

6. The method of claim 5 further comprising creating an entry in a log indicating that the incoming telephone call was automatically responded to.

7. The method of claim 5 wherein employing a response algorithm further comprises:
   transmitting a request to an internal database for additional information;
   receiving additional information from the internal database; and
   selecting the pre-recorded message to be transmitted based at least partially on the additional information received.

8. The method of claim 5: wherein employing a response algorithm further comprises:
   transmitting a request to an internal database for additional information, the internal database containing information about the users schedule;
   receiving additional information from the internal database; and
   selecting the pre-recorded message to be transmitted based at least partially on the additional information received, wherein the additional information includes information concerning the scheduled current activity of the user.

9. The method of claim 5 wherein employing a response algorithm further comprises:
   transmitting a request to an internal database for additional information, the internal database containing information about the users contacts;
   receiving additional information from the internal database;
   receiving an indication of the identity of the phone number associated with the telephone making the incoming call; and
   selecting the pre-recorded message to be transmitted based at least partially on the additional information received and the identity information, wherein the additional information includes information concerning the identity of the person making the incoming call.

10. A method of providing an automatic response to an incoming telephone call in a wireless telephone device, comprising:
    receiving a request from a user that incoming telephone calls are to be automatically responded to with a text message;
    receiving an incoming telephone call;
    transmitting a request to an internal database within the wireless device for additional information about the user's schedule;
    receiving additional information from the internal database;
    selecting a text message to be transmitted based at least partially on the additional information received, wherein the text message is selected from a group of text messages;
    transmitting the text message using a text message protocol, wherein the transmitted text message is selected from a plurality of text messages; and disconnecting the incoming telephone call after the text message has been transmitted without accepting a voice message from a caller.

11. The method of claim 10 further comprising creating an entry in a log indicating that the incoming telephone call was automatically responded to.

12. The method of claim 10 further
wherein the additional information includes information concerning a scheduled current activity of the user.

13. The method of claim 10
wherein the selecting a text message to be transmitted is based at least partially on information concerning an identity of the person making the incoming call.

14. A wireless telephone device, comprising:
means for receiving a request from a user that incoming telephone calls are to be automatically responded to;
means for receiving an incoming telephone call;
means for connecting the incoming telephone call;
means for selecting a pre-recorded voice message from a plurality of pre-recorded voice messages saved in an internal database within the wireless device, wherein the means for selecting comprise a response algorithm used to select the pre-recorded voice message;
means for transmitting the selected pre-recorded voice message over a voice path, the voice path being created when the incoming telephone call was connected; and
means for disconnecting the incoming telephone call after the pre-recorded voice message has been transmitted without accenting a voice message from a caller.

15. The wireless device of claim 14, further comprising means for creating an entry in a log indicating that the incoming telephone call was automatically responded to.

16. The wireless device of claim 14, wherein the wireless device is a wireless phone.

17. A wireless telephone device, comprising:
a housing;
a wireless transceiver for communicating with a publicly switched telephone network;
an output device;
an input device, wherein the input device includes a plurality of auto-response buttons; and
an internal memory module, the internal memory module adapted to store pre-recorder messages and instructions for permitting a user of the apparatus to save pre-recorded messages and adapted to store call response data and a response algorithm used to select one of the pre-recorded messages to transmit to a caller when an incoming telephone call is automatically responded to and further adapted to store a log incoming calls automatically responded to, and
wherein the response algorithm employs, at least in part, the call response data stored in the internal memory module to determine which of the one pre-recorded messages to automatically transmit to the caller based on the incoming telephone call.

18. The apparatus of claim 17 wherein the pre-recorded messages are voice messages.

* * * * *